(12) United States Patent
Gardner

(10) Patent No.: US 6,483,576 B1
(45) Date of Patent: Nov. 19, 2002

(54) COUNTERFEIT DETECTION SYSTEM

(75) Inventor: Norman A. Gardner, Penn Valley, PA (US)

(73) Assignee: Laser Lock Technologies, Inc., Bala Cynwyd, PA (US)

( * ) Notice: Subject to any disclaimer, the term of this patent is extended or adjusted under 35 U.S.C. 154(b) by 0 days.

(21) Appl. No.: 09/458,850

(22) Filed: Dec. 10, 1999

(51) Int. Cl.⁷ .................................................. G06K 9/74
(52) U.S. Cl. ......................................... 356/71; 382/137
(58) Field of Search ........................ 356/71, 376, 402; 250/556, 458.1, 461.1, 461.2; 382/115, 116, 137, 140

(56) References Cited

U.S. PATENT DOCUMENTS

| | | | |
|---|---|---|---|
| 4,387,112 A | * 6/1983 | Blach | 427/7 |
| 4,524,276 A | * 6/1985 | Ohtombe | 356/71 |
| 4,540,595 A | 9/1985 | Acitelli et al. | |
| 5,005,873 A | * 4/1991 | West | 283/92 |
| 5,093,147 A | 3/1992 | Andrus et al. | |
| 5,212,558 A | 5/1993 | Obata et al. | |
| 5,289,547 A | 2/1994 | Ligas et al. | |
| 5,574,790 A | 11/1996 | Liang et al. | |
| 5,592,561 A | 1/1997 | Moore | |
| 5,939,468 A | 8/1999 | Siddiqui | |
| 5,974,150 A | * 10/1999 | Kaish et al. | 380/25 |

FOREIGN PATENT DOCUMENTS

| | | |
|---|---|---|
| DE | 198 03 997 | 8/1999 |
| EP | 0 595 583 | 5/1994 |
| FR | 2 739 324 | 4/1997 |
| WO | WO 98 22291 | 5/1998 |
| WO | WO 98 40223 | 9/1998 |

* cited by examiner

Primary Examiner—Frank G. Font
Assistant Examiner—Zandra V. Smith
(74) Attorney, Agent, or Firm—Duane Morris LLP

(57) ABSTRACT

A method for associating source information with a substrate includes providing at least one latent marking agent that emits a signal at an emission wavelength in response to being irradiated with infrared radiation at an excitation wavelength, wherein the signal is at least a portion of the source information; and affixing the at least one latent marking agent to the substrate. The at least one latent marking agent includes an inorganic pigment. In some embodiments of the method, the latent marking agent must be exposed to ultraviolet radiation before it can emit a signal in response to infrared irradiation.

8 Claims, No Drawings

COUNTERFEIT DETECTION SYSTEM

FIELD OF THE INVENTION

This invention relates to the field of authentication and counterfeit detection, and more specifically to systems employing narrow bandwidth marking and detection technology for authentication and/or counterfeit detection.

BACKGROUND OF THE INVENTION

The issues of authentication and counterfeit deterrence can be important in many contexts. Although it is apparent that authenticating money is important, authentication and avoidance of counterfeiting can also be important in many less obvious contexts. For example, improved verification and counterfeiting prevention mechanisms would be very useful in, for example, verifying the contents of shipping containers, verifying the source of goods, etc. Counterfeit products are, by definition, unauthorized copies of a product, its packaging, labeling, and/or its logo(s). Attractive targets for counterfeiters are items with significant brand equity or symbolic value, where the cost of production is below the market value.

In the commercial manufacturing world, it is not uncommon for counterfeit or otherwise unauthorized goods to be manufactured, distributed, and sold in direct competition with authentic goods. Counterfeit articles can so closely resemble genuine goods that consumers readily confuse the counterfeit articles with the authentic articles. In other circumstances, the manufacturer segments the world market for different sales and distribution practices, so that the "counterfeit" goods may be essentially identical to authorized goods. Further, in many instances, a manufacturer produces goods under license from an intellectual property owner, and thus sales outside the terms of the license agreement are also "counterfeit."

A wide variety of attempts have been made to limit the likelihood of counterfeiting. For example, some have tried to assure the authenticity of items by putting encoded or unencoded markings thereon (e.g., an artist's signature on his or her painting). Unfortunately, as soon as the code is broken and/or the markings can be replicated, this method becomes worthless for authentication purposes.

U.S. Pat. No. 5,592,561 discloses an authenticating, tracking/anti-diversion, and anti-counterfeiting system that can track various goods. The system includes a control computer, a host computer, a marking system, and a field reader system, which are all compatible and can be physically linked via data transmission links. An identifiable and unique mark is placed on each good, or on materials out of which the goods are to be made, which enables subsequent inspection. The marks or patterns include areas where a marking agent is applied in an encrypted pattern and areas where it is not applied. The pattern can be scanned or captured by a reader and deciphered into encoded data. The entry can then either be compared directly to a set of authentic entries on a database or decoded and compared to a set of data on the centrally located host database. The marking system provides control over imprinting, allowing a limited number of authorized codes to be printed before re-authorization is required. Monitoring of the marked goods is facilitated by including a unique encrypted pattern having, for example, a unique owner identifier, a unique manufacturer identifier, a unique plant identifier, a unique destination identifier, and time and date information.

U.S. Pat. No. 5,574,790 discloses a multiple-reader system for authentication of articles based on multiple sensed fluorescent discriminating variables, such as wavelengths, amplitudes, and time delays relative to a modulated illuminating light. The fluorescent indicia incorporates spatial distributions such as bar codes as discriminating features, to define a user-determined and programmable encryption of the articles' authentic identity.

U.S. Pat. No. 5,289,547 discloses a method for authenticating articles including incorporating into a carrier composition a mixture of at least two photochromic compounds that have different absorption maxima in the activated state and other different properties to form the authenticating display data on the article, subjecting the display data to various steps of the authenticating method, activating all photochromic compounds, preferential bleaching of less than all of the photochromic compounds, and/or bleaching of all the photochromic compounds, and subsequent examination of the display data following the various activation and bleaching steps by verifying means to enable authentication.

U.S. Pat. No. 5,974,150 discloses an anti-counterfeiting system wherein an authentication certificate affixed to a product is impregnated with dichroic fibers containing a fluorescent dye. Dichroic polymer fibers may also form part of the product to be authenticated. In order to determine if the imprinted code corresponds to the certificate itself, the fiber pattern, which is completely random, is illuminated by a light and read by a scanner. The resulting pattern is then compared to the encoded pattern to determine authenticity.

U.S. Pat. No. 5,212,558 discloses an encoding system wherein a confidential image is recorded on a substrate using invisible ink. The invisible ink emits visible light having a wavelength of about 360–380 nm when irradiated with light having a wavelength of 250 nm. Unfortunately, such a system is easily compromised by viewing the invisible ink with a black light, which is readily available to the public.

Similarly, U.S. Pat. No. 5,939,468 discloses jet ink compositions suitable for producing marks on objects that are invisible to the unaided eye and are visible only when excited by exciting radiation in the preferred wavelength region of from about 275 nm to about 400 nm.

U.S. Pat. No. 5,093,147 discloses a method for providing intelligible marks that are virtually invisible to the unaided eye on the surface of an article. The invention is based on a jet ink containing an organic laser dye that is poorly absorptive in the visible range of about 400 to 700 nm, is absorptive of radiation in the near infrared range of at least 750 nm, and fluoresces in response to radiation excitation in the infrared range at a wavelength longer than that of the exciting radiation. Thus, the marks remain invisible to the naked eye after excitation.

Thus, there remains a need for a system and method for controlling, enabling, and directing marking of goods during the manufacturing process and enabling detection/cross-validation of the marks so that the goods are uniquely identified and tracked throughout the stream of commerce. In addition, there remains a need for a method and system for marking such that the markings are not readily reproducible and detectable with commonly available devices and so that the markings contain sufficient information for product authentication, identification, and tracking. There also remains a need for a system that can be readily altered periodically to hinder counterfeiting.

All references cited herein are incorporated herein by reference in their entireties.

SUMMARY OF THE INVENTION

The invention provides a method for associating source information with a substrate. The method comprises providing at least one latent marking agent that emits a signal at an emission wavelength in response to being irradiated with infrared radiation at an excitation wavelength, wherein the signal is at least a portion of the source information; and affixing the at least one latent marking agent to the substrate. The at least one latent marking agent comprises an inorganic pigment.

Also provided are substrates marked in accordance with the inventive method.

DETAILED DESCRIPTION OF PREFERRED EMBODIMENTS

Embodiments of the invention are particularly suitable for marking goods during the manufacturing process and enabling detection/cross-validation of the marks so that the goods are uniquely identified and tracked throughout the stream of commerce. The markings, which preferably contain source information sufficient to enable product authentication, identification, and tracking, are not readily reproducible and/or detectable with commonly available devices.

Although the invention is particularly suitable for marking products and/or product containers, the invention is suitable for marking information on any substrate which would benefit from having such information encoded thereon in a latent format. Thus, the invention is also suitable for marking substrates such as, e.g., collectibles, money, legal documents, tickets, credit cards, etc. Non-limiting examples of materials from which suitable substrates can be made include paper, wood, synthetic polymers and metals.

The substrate is marked with a latent marking agent. The expression "latent marking agent" denotes a material that emits a detectable signal only after being activated. The expression "latent marking agent" encompasses invisible inks and pigments. It is particularly preferred that the latent marking agent be activated by electromagnetic radiation (EMR), preferably narrow bandwidth EMR (defined herein as EMR not more than 10 nm in width), more preferably EMR having a bandwidth of 5 nm or less, even more preferably single wavelength EMR. In embodiments, the activation or excitation wavelength is preferably at least 900 nm. In embodiments, the activation or excitation wavelength is 915 nm to about 990 nm and/or 1550 nm to 1800 nm.

The EMR is preferably provided by a laser. In embodiments, the laser is a component of a detection apparatus dedicated to the task of screening substrates for latent marks of the invention. The apparatus can include features and components generally known to those of ordinary skill in the art. See, for example, U.S. Pat. No. 4,540,595. Thus, the system can include a transport means for transporting the items to the reading means which consists of a source of radiation having the appropriate wavelength and intensity. The reading means includes a photodetector which reads the fluorescent emission. If necessary, the system can include optical filters to eliminate or minimize undesired radiation, and any pattern recognition circuitry appropriate to the particular code patterns recorded.

Non-limiting examples of materials suitable for use as latent marking agents include rare earth metals, such as, e.g., europium, dysprosium, samarium or terbium, combined with a chelating agent, such as, e.g., an organic ligand, to form a biketonate, acetonate or salicylate. Additional examples include yttria phosphors, inorganic phosphors, Ciba Geigy Cartax CXDP and UV visible Eccowhite series from Eastern Color and Chemical. The marking agent preferably comprises an inorganic pigment, and in certain embodiments, the marking agent is free of organic dyes. The selection of the marking agent is largely dictated by the desired excitation wavelength and emission wavelength. In certain embodiments, it is preferred that the excitation wavelength be longer than the emission wavelength.

The method for affixing the marking agent to the substrate is not particularly limited. The term "affix" as used herein is intended to denote a durable (but not necessarily permanent or unremovable) association between the marking agent and the substrate. Preferably, the association between the marking agent and the substrate is sufficiently durable to remain functionally intact throughout the stream of commerce. The marking agent can be affixed to the substrate directly (e.g., via adsorption and/or absorption) or indirectly (e.g., via an adhesive).

The marking agent is preferably provided in a marking composition. Marking compositions generally comprise a marking agent and a solvent, with the marking agent provided at a concentration of about 2 to about 10 grams/liter of solvent, depending upon the marking agent used. Preferred solvents include methyl ethyl ketone, ethanol and isopropanol. A solvent soluble resin, such as a Lawter resin, can be used if the marking agent is smaller than two microns to avoid precipitation of the marking agent from solution.

The marking compositions can further comprise additives, stabilizers, and other conventional ingredients of inks, toners and the like. In embodiments, various varnishes or additives, such as polyvinyl alcohol, Airvol 203 and/or MM14 (Air Products and Chemicals, Inc., Allentown, Pa.), propylene carbonate, Joncry wax varnishes, and Arcar overprint varnishes, can be added to the marking composition to reduce absorption into the substrate and ensure that the marking agent remains on the surface of the substrate.

Suitable marking means include, e.g., printers, including inkjet, flexographic, gravure and offset printers, pens, stamps, and coaters.

In a particularly preferred embodiment, the marking agent is luminescent pigment Z, K, S, ZH and/or GE (available from Stardust Material, New York, N.Y.), which is dispersed in an aqueous or organic varnish at a 2% to 5% ratio and applied to a substrate via printing or coating. This mark visibly fluoresces when exposed to a specific infrared light range. The illuminated color can vary depending upon the type of pigment utilized.

The illuminated color can also vary when used in conjunction with a colored plastic film or a translucent colored coating or varnish. The colored translucent layer can be printed or laminated on top or under the marking agent. The amounts of possible illuminating colors are virtually endless due to the numerous different translucent colored layers available.

When used in conjunction with the translucent colored layer, one specific marking agent can give virtually endless different illuminating colors, when excited by the appropriate EMR.

In embodiments, a first latent marking agent is adapted to emit a first signal at a first emission wavelength after being irradiated with infrared radiation at a first excitation wavelength, and a second latent marking agent is adapted to emit a second signal at a second emission wavelength after being irradiated with infrared radiation. The infrared radiation which excites the second latent marking agent to fluoresce can be the same as or different from the infrared radiation which excites the first latent marking agent. In either case, the first emission wavelength and the second emission wavelength differ, preferably by at least 5 nm, more preferably by at least 50 nm. These embodiments are useful, e.g., to provide multiple or redundant levels of protection or authentication, wherein authorized users having low-level clearance can detect only the first signal and are not informed of the second signal, whereas users having a higher level clearance are aware of, and can verify the presence of the second signal. Such a system guards against security breaches from within an organization.

The signal emitted by the latent marking agent is preferably a fluorescent emission. In certain embodiments, the emission wavelength is about 915 nm to about 1800 nm. In certain embodiments, the signal is a fluorescent emission at a visible wavelength.

Thus, products can be authenticated through the stream of commerce by irradiating any marking agent affixed to the product with EMR of a predetermined excitation wavelength and monitoring a predetermined emission wavelength for a signal confirming the presence of the latent marking agent on the substrate.

In embodiments, the monitoring is accomplished by a detector exclusively tuned to the emission wavelength. The expression "exclusively tuned" indicates that the detector detects only a narrow band of wavelengths within ±5 nm of the emission wavelength.

In certain embodiments, the latent marking agent must be exposed to ultraviolet radiation before it can emit the signal in response to being irradiated with infrared radiation. These embodiments can be useful for a variety of purposes, including demonstrating that a document has been photocopied, since photocopiers expose originals to ultraviolet radiation.

A product package can be marked with a first marking agent designed to emit fluorescent radiation at a first emission wavelength detected by the detector specifically focused on the first emission wavelength.

After a period of time, counterfeiters may figure out how to duplicate the authentication certificate, making it advisable to alter the authentication protocol periodically or after there is a suspicion that the certificate has been compromised. The instant invention provides for such a strategy. For example, the exciting radiation generating means can be replaced or tuned to another wavelength and a different marking agent can be used to provide a signal differing from the compromised signal. If the original marking agent is used along with the updated marking agent, counterfeiters who have compromised the original signal may not realize until it is too late that the original signal has been replaced by a updated signal.

The invention will be illustrated in more detail with reference to the following Examples, but it should be understood that the present invention is not deemed to be limited thereto.

EXAMPLE: Flexographic/Gravure Ink

Disperse Stardust Materials Product Z (CAS 68585-88-6) at a ratio of 2% to 5% in a solution of Polyvinyl Alcohol, water and 0.5% to 2% Surfynol 104PG surfactant with standard mixing equipment. Pass mixture through a wet micronizer to reduce the pigment size to between 3 microns to 8 microns. Then wetting agents, dispersing agents and color dyes or pigments (omit if colorless is desired) are added to the mixture. Adjust viscosity by either increasing water content or adding a viscous PVA MM14 additive. Once mixture has ideal viscosity and suspension of solids, then this mixture or ink is ready to print by standard flexographic/gravure press. Print ink on a white or clear substrate such as paper or film via flexographic/gravure printing press. To the naked eye, the printed ink will have no noticeable difference than any other ink. When the printed ink is excited at 930 nm, which is delivered by a hand-held laser apparatus, a noticeable color will fluoresce, and when the apparatus is removed, the ink will appear as before. If no colored dye or pigment is added to the ink, the color will be a bright glowing green, with red dye/pigment the color will be a bright glowing light, and with black dye/pigment the color will be green. When the laser apparatus is used in total darkness, the fluorescence will appear brighter. When the same ink is excited at 1550 nm, a different color will fluoresce (in colorless it will appear yellow).

While the invention has been described in detail and with reference to specific examples thereof, it will be apparent to one skilled in the art that various changes and modifications can be made therein without departing from the spirit and scope thereof.

What is claimed is:

1. A method for associating source information with a substrate, said method comprising:

providing at least one latent marking agent containing an inorganic pigment that fluoresces at a first emission wavelength in response to illumination at a first excitation wavelength, and also fluoresces at a second emission wavelength in response to illumination at a second excitation wavelength, wherein the first and second excitation wavelengths are unequal and are outside of a visible spectrum, and the first and second emission wavelengths are unequal and are within the visible spectrum;

affixing said at least one latent marking agent to said substrate;

detecting said at least one latent marking agent for distinguishing said substrate from other similar substrates, by applying each of said first and second excitation wavelengths, one at a time, and monitoring for corresponding fluorescence at the first and second emission wavelengths, respectively; and, wherein at least one of said excitation wavelengths is an infrared wavelength beyond said visible spectrum.

2. The method of claim 1, wherein applying at least one of said excitation wavelengths comprises illumination of the substrate with a laser.

3. The method of claim 1, wherein said inorganic pigment is at least one member selected from the group consisting of chelated rare earth metals, yttria phosphors, inorganic phosphors, Cartax CXDP and UV visible Eccowhite.

4. The method of claim 1, wherein said first emission wavelength and said second emission wavelength differ by at least 5 ηm.

5. The method of claim 1, wherein said first emission wavelength and said second emission wavelength differ by at least 50 ηm.

6. The method of claim 1, wherein one of said excitation wavelengths is about 915 ηm to about 990 ηm.

7. The method of claim 1, wherein one of said excitation wavelengths is about 1550 ηm to about 1800 ηm.

8. A method for associating source information with a substrate, said method comprising:

providing at least one latent marking agent containing an inorganic pigment that fluoresces at a first emission wavelength in response to illumination at a first excitation wavelength, and also fluoresces at a second emission wavelength in response to illumination at a second excitation wavelength, wherein the first and second excitation wavelengths are unequal and are outside of a visible spectrum, and the first and second emission wavelengths are unequal and are within the visible spectrum;

affixing said at least one latent marking agent to said substrate;

detecting said at least one latent marking agent for distinguishing said substrate from other similar substrates, by applying each of said first and second excitation wavelengths, one at a time, and monitoring for corresponding fluorescence at the first and second emission wavelengths, respectively; and, wherein said first and second excitation wavelengths are each at least 900 ηm.

* * * * *